United States Patent [19]

Isozumi et al.

[11] Patent Number: 4,922,149
[45] Date of Patent: May 1, 1990

[54] ELECTRIC MOTOR DEVICE

[75] Inventors: Shuzoo Isozumi; Keiichi Konishi, both of Himeji, Japan

[73] Assignee: Mitsubishi Denki Kabushiki Kaisha, Tokyo, Japan

[21] Appl. No.: 276,516

[22] Filed: Nov. 28, 1988

[30] Foreign Application Priority Data

Dec. 18, 1987 [JP] Japan .................. 62-322012
Dec. 18, 1987 [JP] Japan .............. 62-193240[U]
Jun. 13, 1988 [JP] Japan ............... 63-78107[U]

[51] Int. Cl.⁵ ...................... H02K 5/04; H02K 5/14
[52] U.S. Cl. ................................ 310/89; 310/239; 310/249
[58] Field of Search ............ 310/43, 89, 239, 249

[56] References Cited

U.S. PATENT DOCUMENTS 2,795,713  6/1957  Woll et al. ............... 310/89 X
4,100,440  7/1978  Binder et al. ............. 310/89
4,538,085  8/1985  Tanaka ................... 310/239

FOREIGN PATENT DOCUMENTS 0098992  9/1986  European Pat. Off.
2075276  11/1981  United Kingdom ............ 310/242

Primary Examiner—Patrick R. Salce
Assistant Examiner—Judson H. Jones
Attorney, Agent, or Firm—Sughrue, Mion, Zinn, Macpeak & Seas

[57] ABSTRACT

A rear housing structure of an electric motor device is disclosed, which comprises a cup-shaped rear bracket made of resin coupled to the cylindrical yoke. According to one aspect of the invention, the rear bracket is secured to the yoke by a through bolt which extends, at the head thereof, through a boss formed at the outside of the side of the bracket, and is fastened to the front frame coupled to the front (or output) side of the yoke. An abutment member, which may by integral with the yoke or the base plate for the brush of the motor, extends radially outwardly from the rear end of the yoke, so that the front end of the boss abuts against this abutment member. Thus, the fastening force of the through bolt is born by the abutment member and the development of the bending and tensile stresses in the bracket can be prevented. According to another aspect, the through bolt extends through the bottom of the cup-shaped rear bracket and runs within the yoke to be fastened to the front frame. The rear end of the yoke is expanded radially outwardly to form a funnel-shaped socket into which the end portion of the bracket is fitted. The engaging end portion of the bracket has an equal thickness as other portions of the side of the bracket. Thus, enough mechanicl strength of the end portion of the bracket is ensured against the radially outwardly directed force generated therein by the fastening force of the bolt.

13 Claims, 4 Drawing Sheets

ELECTRIC MOTOR DEVICE

BACKGROUND OF THE INVENTION

1. Field of the Invention

The present invention relates to an electric motor device, and more particularly to a starting motor for an internal combustion engine of an automotive vehicle, which comprises a cup-shaped rear bracket made of resin coupled to the central cylindrical yoke as part of its housing structure.

2. Description of the Prior Art

The starting motor for an internal combustion engine of an automobile, etc., usually comprises a D.C. electric motor accomodated in a cylindrical yoke, and an output portion (including the pinion engaging with the ring gear of the engine) accommodated in the front frame coupled to the yoke, the rear side (the side opposite to the output side) of the yoke being closed by a cup-shaped rear bracket. The rear bracket is made of a resin for the purpose of reducing the weight thereof and is secured to the yoke by means of a through bolt. Thus, the rear bracket is liable to failures due to the bending and tensile stresses developed therein, resins usually exhibiting peculiar weakness against such stresses. Further, as the rear brackets are placed in a high temperature environment for a long period of time, they are prone to be deformed continuously by the phenomenon called creep under the fastening force.

FIG. 1 shows an axial sectional view of the rear portion of a conventional starting motor for an internal combustion engine. Armature 1, which includes armature coils 1b wound around the armature core and coupled to commutator 1a, opposes field permanent magnets 2 fixed to the inner circumferential surface of yoke 3 for generating magnetic field. Cup-shaped rear bracket 4 made of a resin is coupled at the marginal portion thereof to the rear end of the cylindrical yoke 3 by a socket and spigot joining structure and is secured thereto by through bolt 5 which, extending through boss 4a formed on the outer side surface of the rear bracket 4, is fastened to the unillustrated front frame of the starting motor at the threaded end thereof. The front frame 6 is coupled to the front end of the yoke 3 for rotatably supporting the output portion of the starting motor including the pinion gear (not shown) engaging with the ring gear of an internal combustion engine. Brush 7, which is slided into and held by brush holder 7a mounted to the bottom portion of the cup-shaped bracket 4 through base plate 7b, slidably contacts the commutator 1a to supply an electric power to the armature coils 1b. The armature shaft 1c is rotatably supported by bearing 8 mounted in the central recess of the bracket 4.

The housing structure shown at FIG. 1 suffers from the following disadvantages. As the through bolt 5 extends through the boss 4a of the rear bracket 4 to fasten it to the yoke 3, portions A and B are subjected to bending and tensile stresses, respectively. The bracket 4, however, is made of resin, which generally exhibits peculiar weakness against bending and tensile stresses, although relatively strong against compressive stresses. As a result, these portions A and B of the bracket 4 subjected to the bending and tensile stresses are prone to form fractures and cracks therein; in an extreme case, the bracket 4 may be broken due to the bending of the through bolt 5. Further, the brush 7 must be provided with a separate grounding circuit, because the base plate 7b thereof is mounted to the rear bracket 4 made of an electrically insulating material, i.e. a resin. Thus, it is necessary to provide the brush 7 with a lead wire (not shown) to connect it to a metallic member such as the yoke 3. This results in an increased number of assembling steps and an increased production cost of the starting motor.

Stresses under a high temperature condition cause similar problems in other conventional starting motors having a rear bracket made of resin fastened by a through bolt. FIG. 2 shows the rear portion of another conventional starting motor for an internal combustion engine of an automobile, which has a structure similar to that shown in FIG. 1, whereby like reference numerals represent like or corresponding parts in both figures. However, the through bolt 5, extending at the head 5b thereof through the bottom portion 4d of the cup-shaped rear bracket 4, runs within the bracket 4 and the yoke 3 and is screwed to the front frame, i.e. the front bracket, which is not shown in the figure, of the starting motor. The figure further shows the lead 7d connecting the brush holder 7a to an electromagnetic switch (not shown) to supply electric power.

The housing structure shown in FIG. 2 suffers the following disadvantage. Due to the fastening force applied by the through bolt 5 on the bracket 4, the side portion 4e of the bracket 4 is subjected to a force which tends to open (i.e. expand radially outwardly) the end portion of the bracket 4. Further, as the starting motor is installed near the internal combustion engine of the automobile, it is liable to be heated to a high temperature (e.g. to about 130 degrees centigrade) for a long period of time. Thus, the rear bracket 4, which is made of a thermoplastic resin, is continuously deformed due to the phenomenon called creep; as a result, the open end portion of the bracket 4 is radially extended and the fastening force of the bolt 5 is diminished.

In view of the above-mentioned disadvantage of the structure of FIG. 2, a joining structure of the rear bracket shown in FIG. 3 has been proposed, wherein the radial positions of the annular recesses 3b and 4b of the socket and spigot joint formed at the ends of the yoke 3 and the bracket 4, respectively, are reversed with respect to the radial positions thereof in FIG. 2, so that the projection 4c at the end portion of the bracket 4 is contained from without by the projection 3c of the yoke 3. In the structure shown in FIG. 3, however, it is difficult to increase the thickness of the side portion 4e of the bracket 4 in the radially inward direction without bringing about interference with the through bolt 5 and the spring for the brush (not shown). Thus, the thickness of the projection 4c of the bracket 4 needs must be limited to a small dimension, so that it can hardly bear the stresses developed therein, especially under a high temperature condition promoting the progress of creeps in thermoplastic resins under which the starting motor is placed for a long period of time. Thus, failures are prone to develop thereat to diminish the reliability of the device.

The housing structures of electric motor devices including a rear bracket similar to those described above are disclosed, for example, in U.S. Pat. No. 4,538,085 or European Patent 0,098,992B1, which are deemed to suffer from aforementioned disadvantages provided that the rear brackets thereof are made of resin.

SUMMARY OF THE INVENTION

Thus, an object of the present invention is to provide a motor device which is free from the above-mentioned drawbacks of conventional devices. More specifically, the present invention aims at providing a motor device having a rear bracket made of resin as part of the housing structure, wherein the rear bracket is free from failures caused by stresses developed therein due to the fastening force applied thereto.

A further object of the present invention is to provide a motor device of the above-mentioned type in which the magnitude of bending or tensile stresses developed in the rear bracket made of resin is diminished to under an allowable working stress level. Since resins exhibit peculiar weakness against such stresses, the reduction thereof greatly enhances the reliability of the rear bracket. Further, the present invention aims at reducing the bending of the through bolt securing the rear bracket to the front frame so that the failure of the bolt can be prevented.

A still further object of the present invention is to provide a motor device of the above-mentioned type in which the rear bracket is free from failures even when it is placed in a high temperature environment for a long period of time. As the starting motor for an internal combustion engine of an automobile are often subjected to such high temperature environment, it is important to enhance the reliability in such severe environment.

An additional object of the present invention is to provide a motor device of the above-mentioned type which has a simple structure and can be produced by a small number of simple steps and at a low cost.

According to one aspect of the present invention, an electric motor device is provided which comprises: a hollow cylindrical yoke accomodating the field magnets and the armature of the electric motor; a front frame or bracket coupled to the front end of the yoke to accomodate the output portion of the motor; and a cup-shaped rear bracket made of resin coupled to the rear end of the yoke and rotatably supporting the rear end portion of the shaft of the armature, wherein the bracket includes a boss formed integrally at a side portion of the bracket to extend radially outwardly therefrom. Further, a through bolt extends through the boss at one end thereof and is fastened to the front frame at the other end thereof, thereby securing the bracket to the yoke. Further, according to the present invention, an abutment member is provided which extends radially outwardly from the rear end of the yoke (i.e. between the rear end of the yoke and engaging end portion of the bracket) at the circumferential position at which the boss of the bracket is formed, whereby the abutment member comprises a rear surface against which the front end surface of the boss abuts. Thus, the fastening force applied from the bolt is born by this abutment member, and the development of particularly harmful bending and tensile stresses in the bracket can be effectively supressed. In addition, the bending of the through bolt, which may lead to a failure of the rear housing structure, can be prevented.

The abutment member according to the first aspect of the present invention may be constituted by a radially outward extension formed integrally with the yoke at the rear end thereof, by such a process as cold forging or the drawing from an iron sheet. Alternatively, it may be constituted by a radially outward extension of the annular metallic plate sandwiched between the yoke and the bracket, upon which plate the brush holder is mounted to supply the electric power to the armature of the motor.

According to the second aspect of the present invention, an electric motor device is provided in which the through bolt securing the rear bracket to the yoke extends through the bottom portion of the cup-shaped bracket and runs axially within the yoke to be fastened to the front frame, so that a force tending to expand the engaging end portion of the bracket results from the fastening force of the through bolt. Thus, according to the present invention, the rear end portion of the hollow cylindrical yoke is stepped toward the radially outward direction to form a funnel-shaped female engaging end portion having an enlarged inner diameter which is substantially equal to the outer diameter of the side portion of the cup-shaped rear bracket. As a result, the end portion of the cup-shaped bracket having as great a thickness as other portions of the side thereof can be fitted into the funnel-shaped female end of the yoke. Thus, the engaging portion of the bracket is given enough mechanical strength to bear the stresses developed therein even when it is heated to a high temperature for a long period of time.

BRIEF DESCRIPTION OF THE DRAWINGS

The novel features which are believed to be characteristic of the present invention is set forth with particularity in the appended claims. The further details of the present invention, however, both with respect to its structure and function thereof, may be best understood from the following detailed description of the preferred embodiments, taken in conjunction with the accompanying drawings, in which:

FIG. 8 is also a view similar to that of FIG. 4, but showing a fifth embodiment according to the present invention, wherein the through bolt extends within the yoke, the rear end of which is radially expanded to form a funnel-shaped female end into which the end portion of the rear bracket is fitted in.

In the drawings, like reference numerals represent like or correspoding portions or parts.

DETAILED DESCRIPTION OF THE PREFERRED EMBODIMENTS

Figure 1:
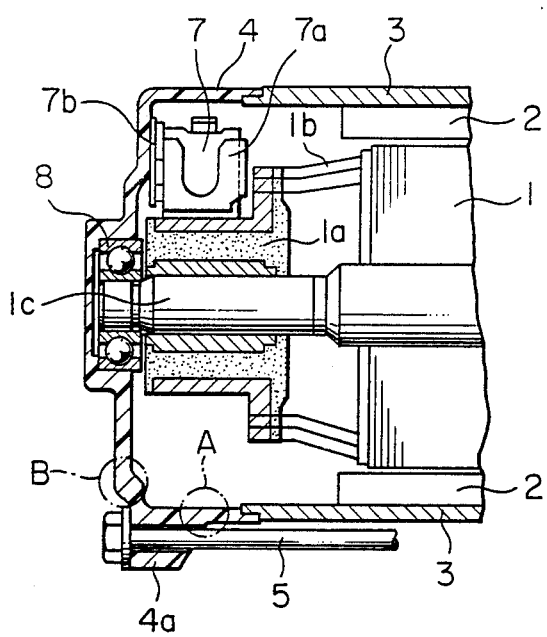
FIG. 1 is a partial axial sectional view of the rear portion of a conventional starting motor for an internal combustion engine, showing together a portion of the front frame thereof.
Figure 4:
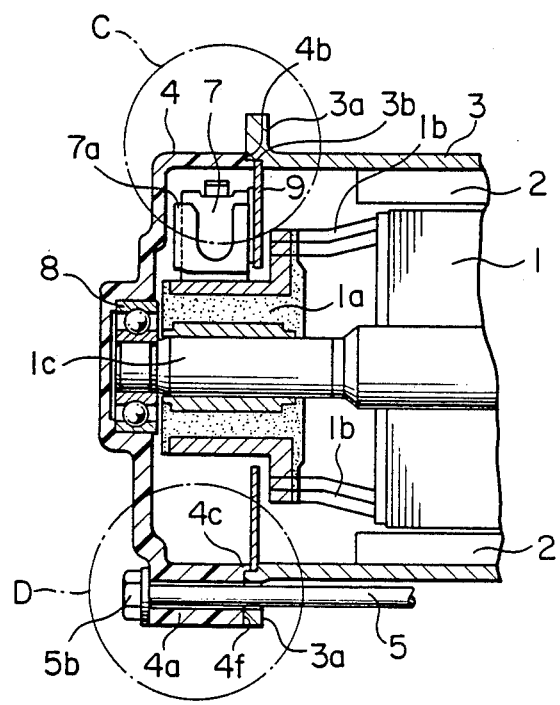
FIG. 4 is a view similar to those of FIGS. 1 and 2, but showing a first embodiment of a rear housing structure of the starting motor for an internal combustion engine according to the present inventin, wherein the yoke has a radially outwardly extending flange forming the abutment member for the boss of the rear bracket letting through the through bolt.

FIG. 4 of the drawings shows a starting motor for an internal combustion engine of an automobile according to the present invention having a structure similar to that shown at FIG. 1. Thus, the armature 1 including armature coil 1b coupled to the commutator 1a opposes the field permanent magnets 2 secured to the inner surface of the cylindrical yoke 3. However, the yoke 3, which is formed from an iron sheet by the drawing process, has an annular flange 3a formed at the rear end thereof opposing the rear bracket 4, which extends radially outwardly along the whole circumference of the rear end of the yoke 3. Cup-shaped bracket 4 made of a thermoplastic resin is coupled to the yoke 3 at the end portion thereof by the socket and spigot joining structure. Namely, the yoke 3 has an annular recess 3b formed at the radially inner portion of the rear end thereof; the bracket 4, on the other hand, has an annular recess 4b formed at the radially outward portion of the abutting end thereof. The annular male projection 4c thus formed at the radially inner portion at the end of the bracket 4 is fitted into the female recess 3b of the yoke 3, the annular metallic plate 9 for supporting the brush holder 7a being held therebetween, whereby the plate 9 is fixedly secured in its position by the resilient force applied thereto from the axially compressed projection 4b of the bracket 4. Boss 4a, which is formed integrally on the outside of the side of the cup-shaped bracket 4 and having a central bore for letting the through bolt 5 to extend therethrough, substantially extends over the whole axial length of the bracket 4 to abut at the front end surface 4f thereof against the rear surface of the flange 3a of the yoke 3. The through bolt 5 is fastened to the front frame (not shown) of the starting motor as in FIG. 1. The brush 7 held in the holder 7a slidably contacts the commutator 1a to supply an electric power to the armature coils 1b, and the armature shaft 1c is rotatably supported by the bearing 8 mounted on the bracket, as in the device of FIG. 1. The brush holder 7a, however, is mounted on the metallic plate 9.

Since the boss 4a for the through bolt 5 abuts at the front end thereof against the outwardly extending flange 3a of the yoke 3, the fastening force exerted thereon from the head 5b of the bolt 5 is born by the flange 3a. Thus, the bracket 4 is not subjected to bending or tensile stresses; the stresses developed in the boss 4a are limited to compressive ones. Consequently, no fractures or cracks will develop in the bracket 4. Consequently, the stresses in the through bolt 5 are limited to those in the axial direction. Thus, the failure of the bolt 5 due to the bending can effectively be prevented. In addition, as the brush holder 7a is mounted on the metallic plate 9 which is in contact with the yoke 3, no separate lead wire is needed to provide the brush 7 with a grounding circuit.

Figure 5:
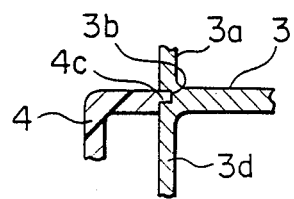
FIG. 5 is a partial sectional view of a second embodiment of the present invention obtained by modifying the rear housing structure of FIG. 4, wherein the figure shows the portion corresponding to the portion within circle C in FIG. 4.

FIG. 5 shows a modification of the first embodiment shown in FIG. 4. In the structure shown in FIG. 5, the yoke 3 has an annular disk-shaped radially inwardly extending flange 3d as well as the radially outwardly extending flange 3a. The outer and inner flanges 3a and 3d of the yoke 3 are formed integrally therewith by the cold forging process, the inner flange 3d serving as the base plate for the brush holder just as the annular plate 9 of FIG. 4. Thus, the need for a separate base plate for the brush holder is eliminated, and the number of parts and production steps can be reduced. The rear bracket 4 is coupled at the end thereof to the yoke 3 by a socket and spigot joining structure as in the case of FIG. 4, the annular male projection 4c of the bracket 4 being fitted into the annlar recess 3b formed on the rear end surface of the yoke 3.

Figure 6A:
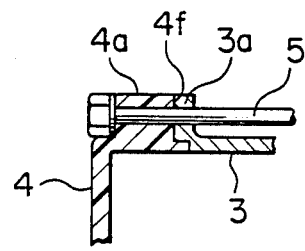
FIGS. 6a and 6b are partial sectional views of another modification of the rear housing structure shown in FIG. 4, FIGS. 6a and 6b showing the portions corresponding to the portions within circles D and C in FIG. 6a, respectively, whereby the position of the parts in FIG. 6a is turned upside down with respect to that in FIG. 4.
Figure 6B:
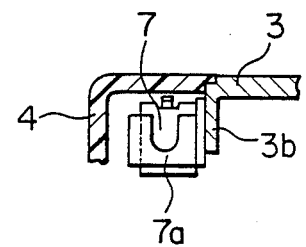

FIGS. 6a and 6b shows another modification of the housing structure according to the first embodiment of the present invention shown in FIG. 4. In the structure shown in FIGS. 6a and 6b, the yoke 3 has radially outward extension 3a formed at the rear end thereof by bending a rear end portion of the yoke 3 radially outwardly by the drawing of iron sheet, at the circumferential position at which the boss 4a for letting through the through bolt 5 is formed at the outside of the side of the cup-shaped rear bracket 4. Thus, the front end surface 4f abuts against the extension 3a of the yoke 3, as shown in FIG. 6a; the rest of the rear end portion of the yoke 3 is bent radially inwardly by the same drawing process to form inward extension 3h which constitutes the base plate for mounting the brush holder 7a holding the brush 7 therein. It is pointed out in this connection that when the field permanent magnets have as many as or more than 6 poles, the flux generated by the field magnets can be increased sufficiently to reduce the thickness of the yoke 3; thus, the yoke having the extensions 3a and 3h can be formed by the drawing of iron sheet without difficulty. The extensions 3a and 3h of the yoke 3, however, may also be formed by the cold forging process.

Figure 7:
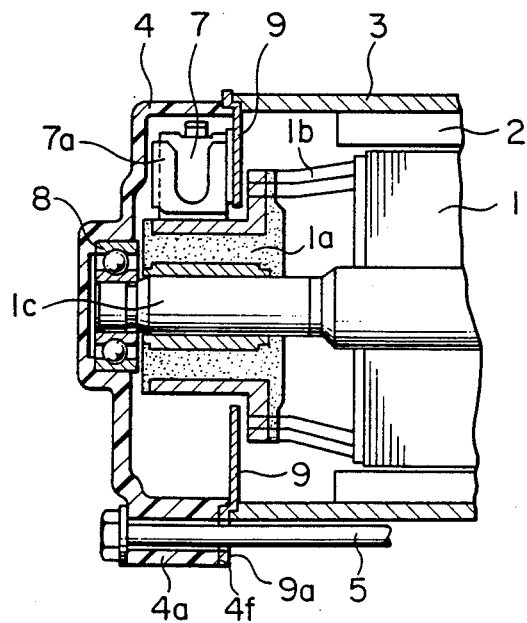
FIG. 7 is a view similar to that of FIG. 4, but showing a fourth embodiment according to the present invention, wherein the annular plate for supporting the brush holder has a radially outward extension forming the abutment member for the boss of the bracket.

Referring now to FIG. 7 of the drawings, a fourth embodiment according to the present invention is described, which has also a structure similar to that shown at FIG. 1. The annular disk-shaped metallic plate 9 constituting the base plate for the brush holder 7a, however, is stepped at the outer marginal portion thereof to be fittingly inserted and tightly held between the L-shaped cross-sectional ends of the yoke 3 and the bracket 4 forming the socket and spigot joining structure. Further, a portion of the radially outwardly extending stepped marginal portion of the plate 9 is extended further radially outward to form an outer abutting extension 9a at the circumferential position thereof at which the boss 4a for the through bolt 5 is formed on the outside of the side of the cup-shaped rear bracket 4; the boss 4a, on the other hand, extends substantially over the whole axial length of the side of the rear bracket 4 to abut against the outer extension 9a of the plate 9 at the front end surface 4f thereof. Otherwise, the second embodiment has a structure similar to that of the conventional device shown at FIG. 1, like reference numerals representing like or corresponding parts or portions.

The extension 9a of the base plate 9 offers the same advantage as the flange 3a of the first embodiment with respect to the minimization of the bending and tensile stresses generated in the bracket 4. Further, the metallic plate 9 eliminates, just as the corresponding metallic plate 9 of the first embodiment, the necessity of providing a separate lead wire to the brush holder 7a as part of the grounding circuit.

In the first through fourth embodiments described above, the boss 4a extends substantially over the whole axial length of the side of the cup-shaped bracket 4. The axial length of the boss 4a, however, may be limited to the portion near the flange or outer extension 3a of the yoke 3 (FIGS. 4 and 6a), or near the extension 9a of the annular metallic plate 9 (FIG. 7), without diminishing the advantage offered by the present invention. The abridgement of this axial length of the boss 4a not only reduces the amount of the material forming the bracket 4, but also shortens the length of the through bolt 5, thereby reducing the overall weight of the housing structure. Further, in the case of the fourth embodiment, the outer extension 9a of the annular metallic plate 9 may extend in the circumferential direction outside of the angle at which the the boss 4a is formed on the side of the bracket 4.

Figure 2:
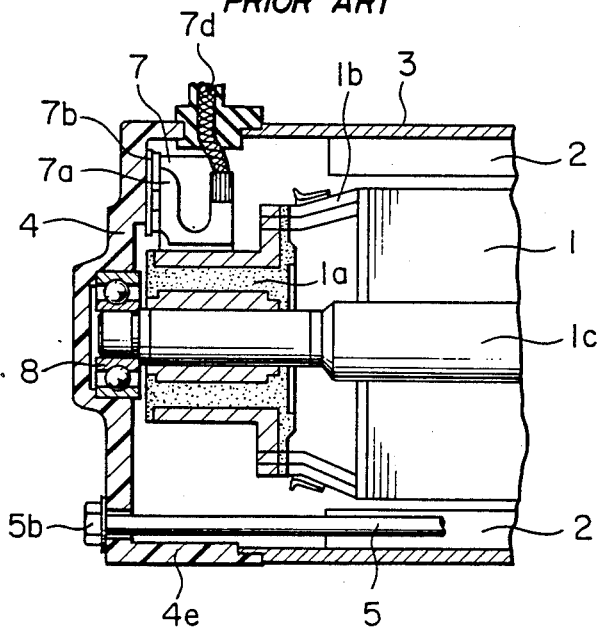
FIG. 2 is a view similar to that of FIG. 1, except for the ommission of the front frame, but showing another conventional starting motor for an internal combustion engine.
Figure 3:
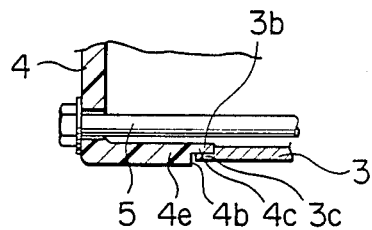
FIG. 3 is a partial sectional view of a rear housing structure of still another conventional starting motor, showing a portion thereof near the head of the fastening through bolt.
Figure 8:
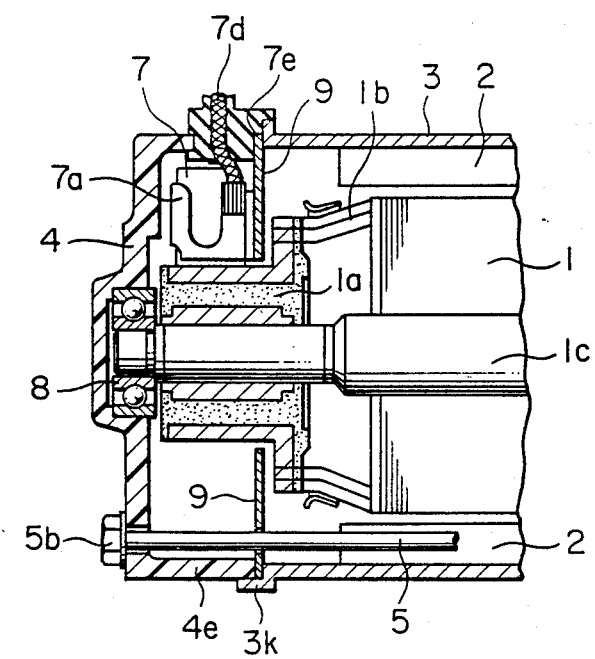

FIG. 8 shows a fifth embodiment according to the present invention which has a structure similar to those shown at FIGS. 2 and 3. The rear end portion of the yoke 3, however, is stepped in the radially outward direction to form a funnel-shaped female end or socket 3k into which the front open end portion of the side 4e of the cup-shaped rear bracket 4 is fitted in, the inner diameter of the funneled female end 3k being substantially equal to the outer diameter of the side portion 4e of the rear bracket 4, which is made of a thermoplastic resin. The male end portion of the bracket 4 fitted into the socket 3k has the same thickness as the other portions of the side 4e of the rear bracket 4. Further, annular metallic plate 9, to which the brush holder 7a holding the brush 7 is mounted, is held between the front end of the side 4e of the bracket 4 and the bottom of the socket 3k of the yoke 3, and an annular fixture 7e made of rubber for leading out the lead 7d for the brush 7 is fitted into the opening formed between the yoke 3 and the bracket 4. The bolt 5, extending next to the head 5b thereof through the hole in the bottom of the cup-shaped bracket 4 and then through the hole in the annular plate 9, runs axially within the yoke 3 and is screwed to the front frame (i.e. front bracket), which is not shown in the figure, so that the rear bracket 4 is tightly secured to the yoke 3 by the fastening force of the bolt 5. Except for the details described above, the device of FIG. 8 has a struture similar to that of the device of FIG. 2.

In the structure according to FIG. 8, the funnel-shaped female end 3k eliminates the need for providing the front end of the rear bracket 4 with an annular recess to form a male projection of reduced thickness thereat. Thus, the mechanical strength of engaging portion of the rear bracket 4 is sufficiently enhanced, so that even when it is placed in a high temperature environment for a long period of time, the radially outward force developed thereat by the fastening force of the bolt 5 can be contained by the enlarged diameter portion of the funnel-shaped socket 3k without causing failures in the end portion of the bracket 4.

In the fifth embodiment of FIG. 8, the outer diameter of the side 4e of the rear bracket 4 is substantially equal to that of the yoke 3. However, by enlarging the inner diameter of the funnel-shaped end portion 3k of the yoke 3, the side 4e may be made to have an outer diameter substantially greater than that of the yoke 3 so that the rear interior space of the starting motor enclosed by the bracket 4 can be substantially expanded. Further, when the field permanent magnets 2 have as many as or more than 6 magnetic poles, yoke 3 having the funneled end 3k can by formed by the cost-saving iron sheet drawing process, whereby the funneled end 3k can be formed by a press.

While description has been made of particular embodiments of the present invention, it will be understood that many modifications may be made without departing from the spirit thereof. For example, the field magnets may comprise, instead of permanet magnets, electromagnets having coils for generating magnetic field. The appended claims are contemplated to cover any such modifications as fall within the true spirit and scope of the present invention.

What is claimed is:

1. An electric motor device comprising:
   a hollow cylindrical yoke made of a metallic material;
   a front frame coupled to a front end of said yoke to accomodate an output portion of said electric motor device;
   field magnets secured to the inner circumferential surface of said yoke;
   an armature mounted an a shaft to oppose said field magnets over a radia gap formed therebetween;
   a cup-shaped bracket coupled to an end portion thereof to a rear end of said yoke and rotatably supporting a rear end portion of said shaft of the armature, wherein said cup-shaped bracket is made of a resin and includes a boss formed integrally at a side portion of said cup-shaped bracket to extend radially outwardly therefrom, said boss having an axially extending central through bore formed therein;
   power supply means, including a brush disposed within said cup-shaped bracket in slidable contact with a commutator of said armature, for supplying an electric power to said armature;
   a through bolt extending through said central bore of said boss at one end thereof and fastened to said front frame at the other end thereof, thereby securing said cup-shaped bracket to said yoke by a fastening force of said bolt; and
   an abutment member extending radially outwardly from said rear end of said cylindrical yoke at a circumferential position at which said boss of the bracket is formed, said abutment member including a rear surface against which a front end surface of said boss of the bracket abuts.

2. An electric motor device as claimed in claim 1, wherein said cup-shaped bracket is coupled at said end thereof to the rear end of the cylindrical yoke by means of a socket and spigot joining structure.

3. An electric motor device as claimed in claim 1, wherein said abutment member comprises a radially outward extension of said cylindrical yoke formed integrally at said rear end thereof at a circumferential position at which said boss of the bracket is formed.

4. An electric motor device as claimed in claim 3, wherein said radially outward extension extends over a whole circumference of said rear end of the yoke to form a radially outwardly extending flange thereat.

5. An electric motor device as claimed in claim 1, further comprising a metallic plate member disposed between said end of the cup-shaped bracket and the rear end of said cylindrical yoke to extend radially inwardly therebetween, said plate member having mounted thereon said brush of the power supply means.

6. An electric motor device as claimed in claim 5, wherein said plate member has a form of an annular disk having a central hole through which said shaft of the armature extends.

7. An electric motor device as claimed in claim 5, wherein said plate member is formed integrally with said yoke at the rear end portion thereof.

8. An electric motor device as claimed in claim 6, wherein said plate member is a member separate from the yoke.

9. An electric motor device as claimed in claim 8, wherein said abutment member comprises a radially outward extension of said plate member formed at a circumferential position at which said boss of the bracket is formed, said radially outward extension of said plate member having a rear surface against which the front end surface of said boss abuts.

10. An electric motor device comprising:
- a hollow cylindrical yoke made of a metallic material having a funnel-shaped rear end portion stepped toward the radially outward direction and having an enlarged inner diameter which is substantially equal to the outer diameter of a side portion of a cup-shaped rear bracket;
- a front frame coupled to a front end of said yoke to accommodate an output portion of said electric motor device;
- field magnets secured to the inner circumferential surface of said yoke;
- an armature mounted on a shaft to oppose said field magnets over a radial gap formed therebetween;
- a cup-shaped bracket made of a resin having an end portion fitted into said funnel-shaped rear end portion of said yoke, an outer diameter of said end portion being substantially equal to said enlarged inner diameter of said funnel-shaped rear end portion, said cup-shaped bracket rotatably supporting a rear end portion of said shaft of said armature;
- power supply means, including a brush disposed within said cup-shaped bracket in slidable contact with a commutator of said armature, for supplying an electric power to said armature; and
- a through bolt extending at one end thereof through a bottom portion of said cup-shaped bracket, said bolt running axially within said hollow cylindrical yoke to be fastened to said front frame at the other end thereof, thereby securing said cup-shaped bracket to said yoke by a fastening force of said bolt.

11. An electric motor device as claimed in claim 10, further comprising a metallic plate member inserted between said end of the cup-shaped bracket and the rear end of said cylindrical yoke to extend radially inwardly therebetween, said plate member having mounted thereon said brush of the power supply means.

12. An electric motor device as claimed in claim 11, wherein said plate member has a form of an annular disk having a central hole through which said shaft of the armature extends.

13. An electric motor device as claimed in claim 12, wherein said plate member is a member separate from the yoke.

* * * * *